(12) United States Patent
Gadini et al.

(10) Patent No.: US 8,752,376 B2
(45) Date of Patent: *Jun. 17, 2014

(54) ELECTRO-THERMAL ACTUATOR DEVICE

(75) Inventors: Costanzo Gadini, Frassineto Po (IT); Renato Gaj, Casale Monferrato (IT); Marco Moro, S. Maurizio di Conzano (IT)

(73) Assignee: ELTEK S.p.A., Casale Monferrato, Alessandria (IT)

( * ) Notice: Subject to any disclaimer, the term of this patent is extended or adjusted under 35 U.S.C. 154(b) by 10 days.

This patent is subject to a terminal disclaimer.

(21) Appl. No.: 13/560,572

(22) Filed: Jul. 27, 2012

(65) Prior Publication Data

US 2012/0297764 A1    Nov. 29, 2012

Related U.S. Application Data

(63) Continuation of application No. 12/837,822, filed on Jul. 16, 2010, now Pat. No. 8,245,510, which is a continuation of application No. 11/454,776, filed on Jun. 16, 2006, now Pat. No. 7,779,631, which is a continuation of application No. PCT/IB2004/004063, filed on Dec. 8, 2004.

(30) Foreign Application Priority Data

Dec. 24, 2003    (IT) ............... TO2003A1038

(51) Int. Cl.
*F01B 29/10*    (2006.01)
(52) U.S. Cl.
USPC .............................................. 60/528; 60/529

(58) Field of Classification Search
USPC .................................................. 60/527–529
See application file for complete search history.

(56) References Cited

U.S. PATENT DOCUMENTS

| | | |
|---|---|---|
| 4,711,270 A | 12/1987 | Fornasari |
| 4,776,559 A | 10/1988 | Fornasari |
| 5,572,869 A | 11/1996 | Schantz et al. |
| 5,656,986 A | 8/1997 | Sassone et al. |
| 5,927,400 A | 7/1999 | Bononi et al. |
| 5,929,345 A | 7/1999 | Gadini |
| 5,968,395 A | 10/1999 | Gadini et al. |
| 6,121,588 A | 9/2000 | Cerruti |
| 6,240,728 B1 | 6/2001 | Gadini |

(Continued)

FOREIGN PATENT DOCUMENTS

| | | |
|---|---|---|
| EP | 1 041 186 A2 | 10/2000 |
| WO | WO2005/066489 A1 | 7/2005 |

OTHER PUBLICATIONS

RAST 2.5, PDF (Tue., Dec. 12, 2006) from rast2_5.drw E:1— Released by Sabine—Stoll (19 pages).

*Primary Examiner* — Hoang Nguyen
(74) *Attorney, Agent, or Firm* — Heslin Rothenberg Farley & Mesiti P.C.; Victor A. Cardona, Esq.

(57) ABSTRACT

An electro-thermal actuator device includes a case defining a cavity in which are housed a thermal actuator, an electrical heater and, at least partially, an actuating shaft. The device comprises a multipolar connector for the rapid, secure and reliable coupling to a respective source of electrical power supply for the heater. The connector can be configured as an adapter unit distinct from the case, suitable to transform a traditional electro-thermal actuator device into the actuator device described above.

20 Claims, 10 Drawing Sheets

(56) References Cited

U.S. PATENT DOCUMENTS 6,813,886 B2   11/2004  Cerruti et al.
6,916,086 B2    7/2005  Gadini et al.
7,779,631 B2 *  8/2010  Gadini et al. .................. 60/528
8,245,510 B2 *  8/2012  Gadini et al. .................. 60/528
2010/0293941 A1 11/2010 Gadini et al.

* cited by examiner

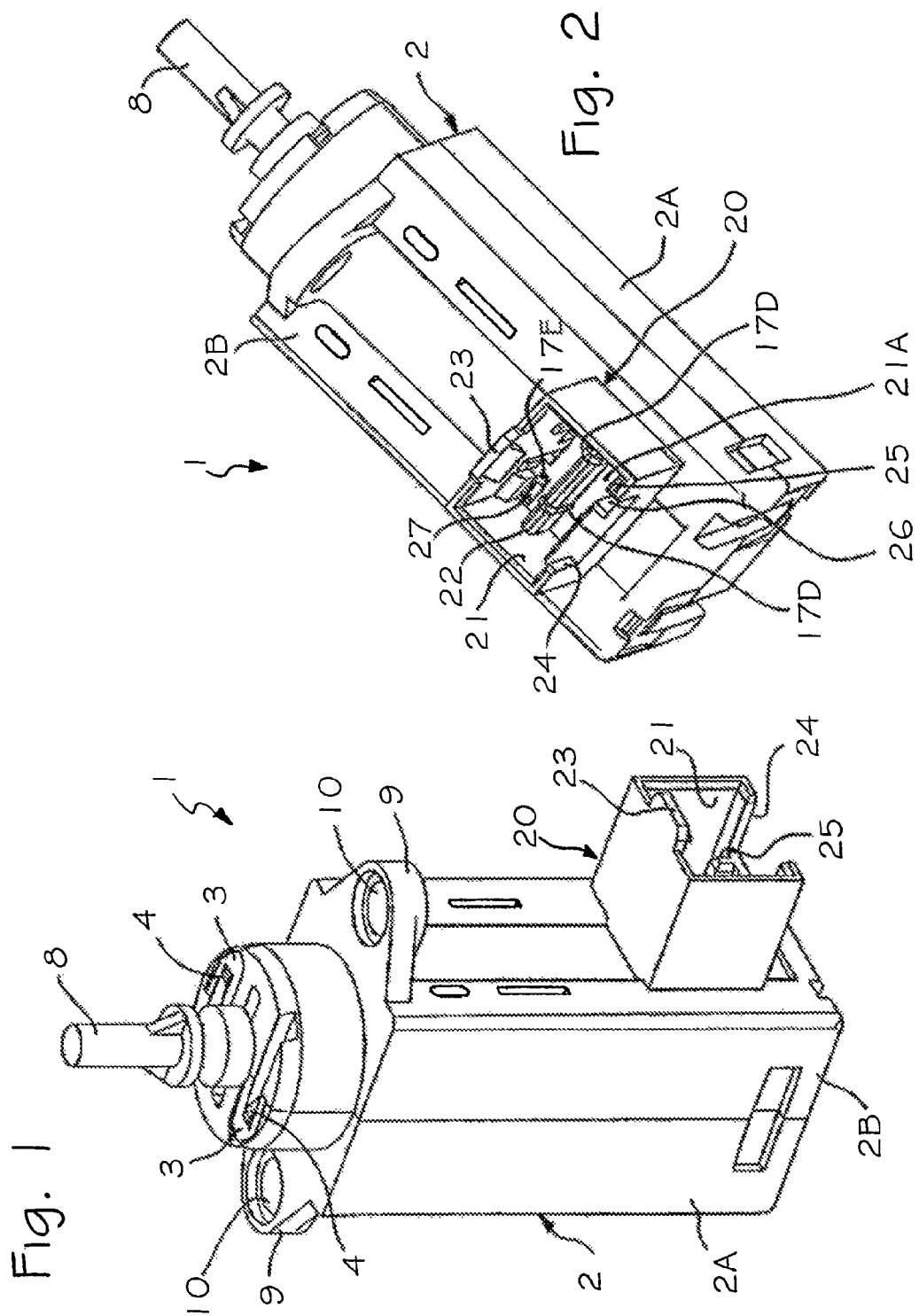

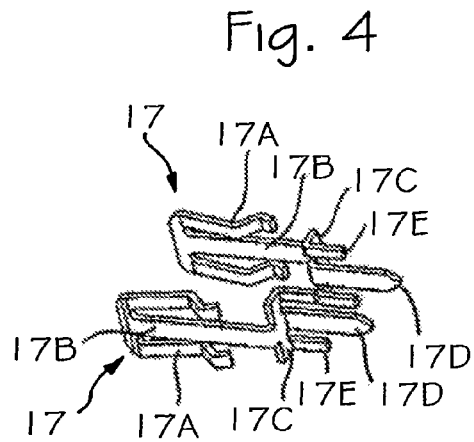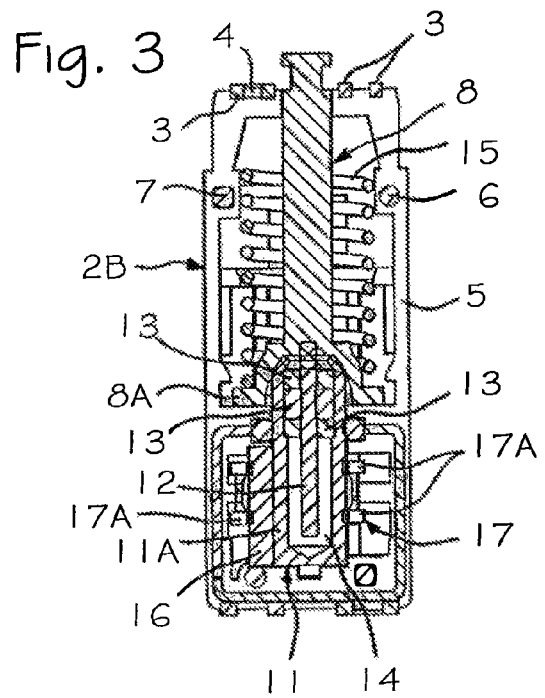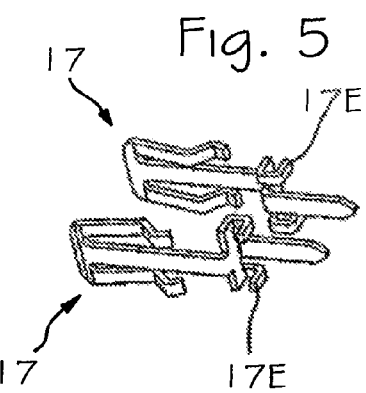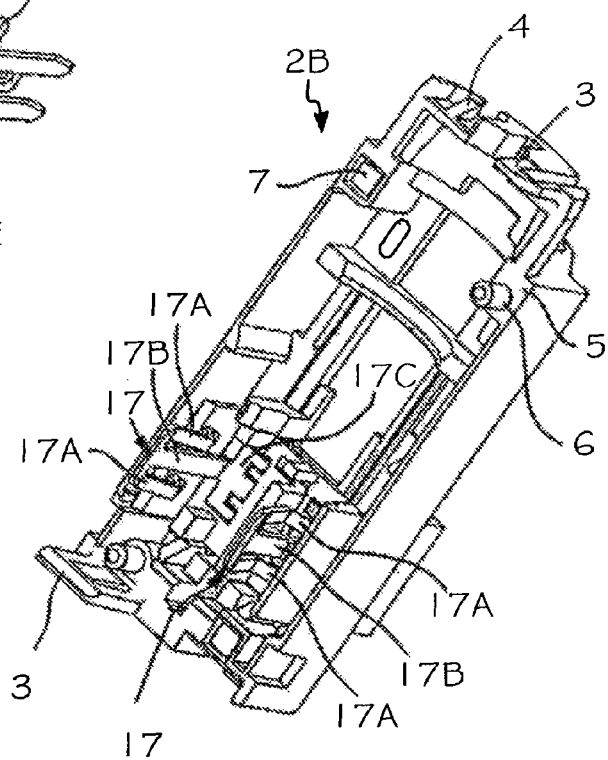

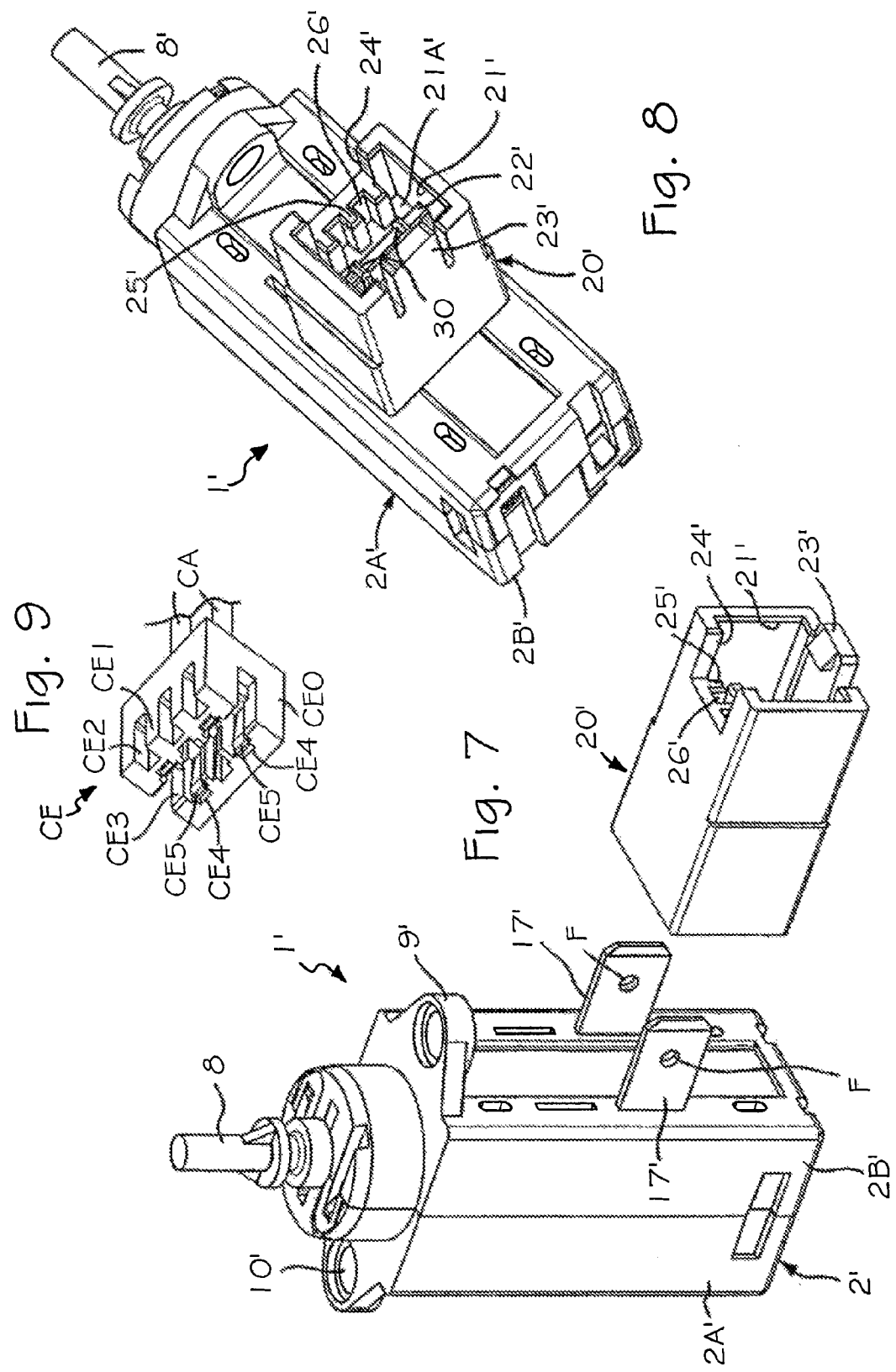

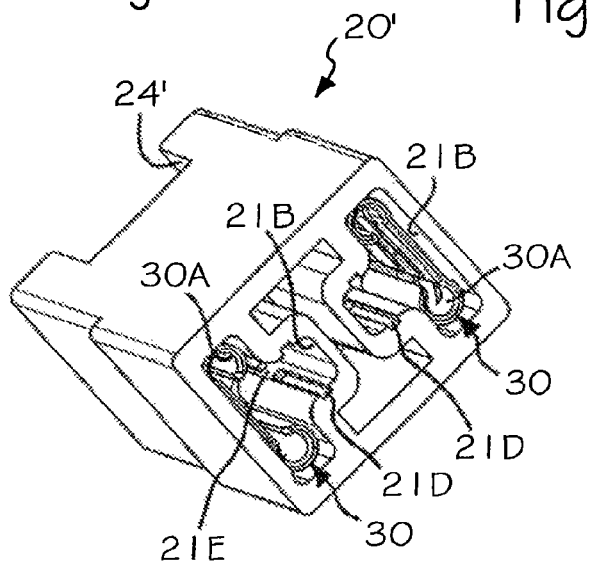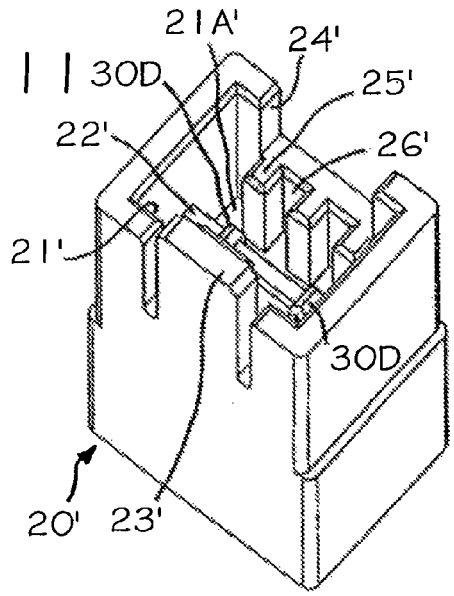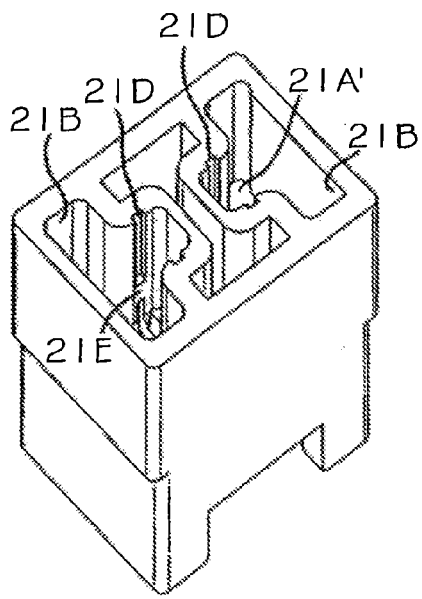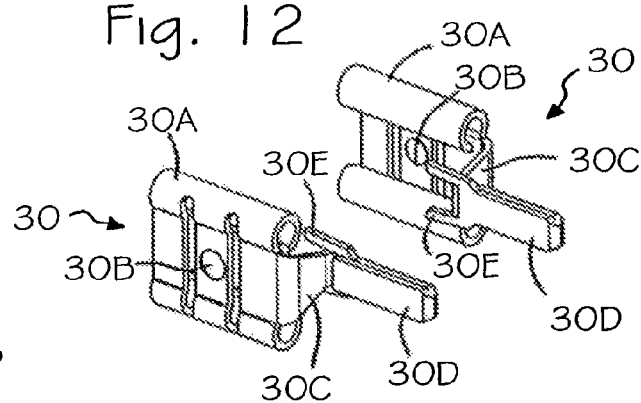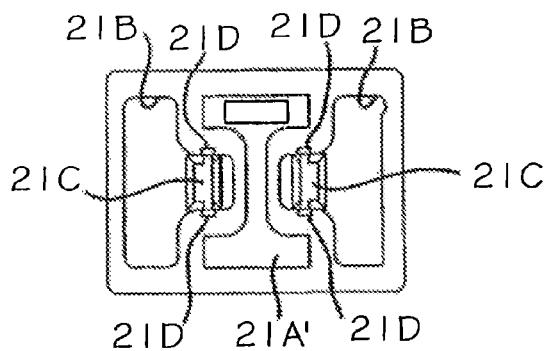

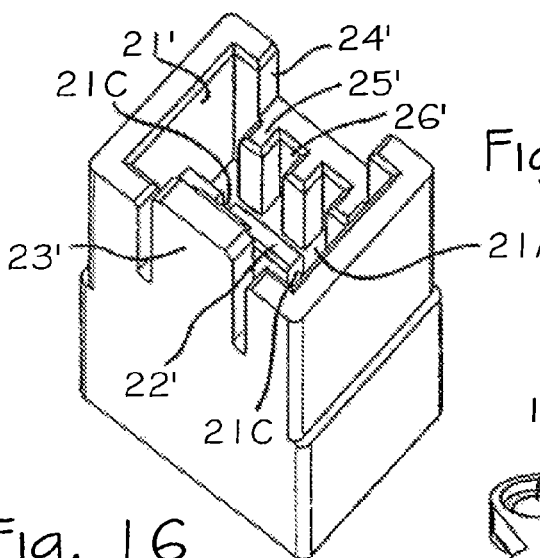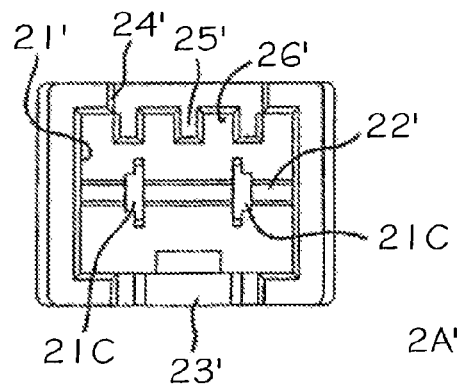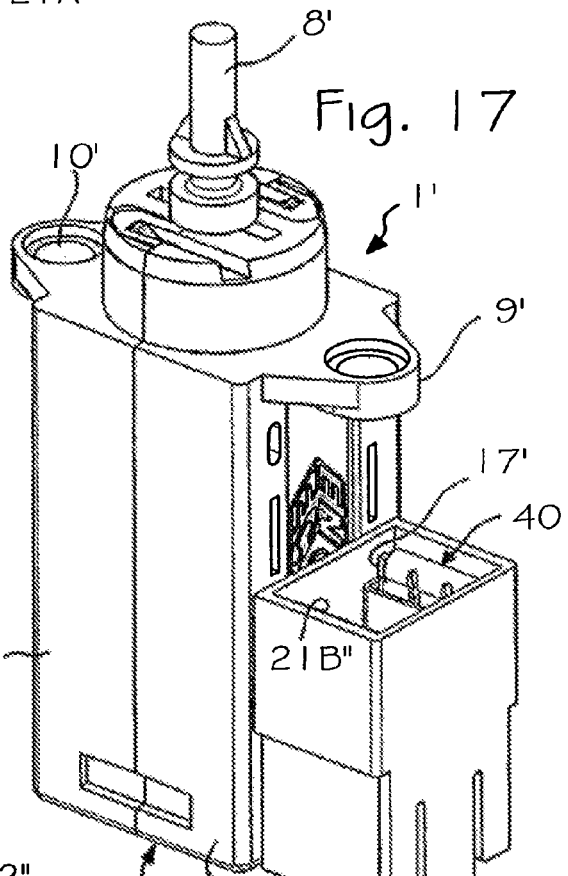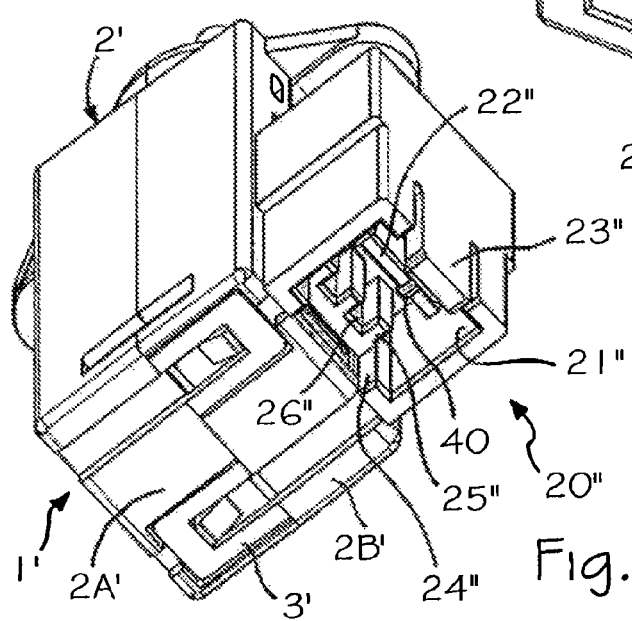

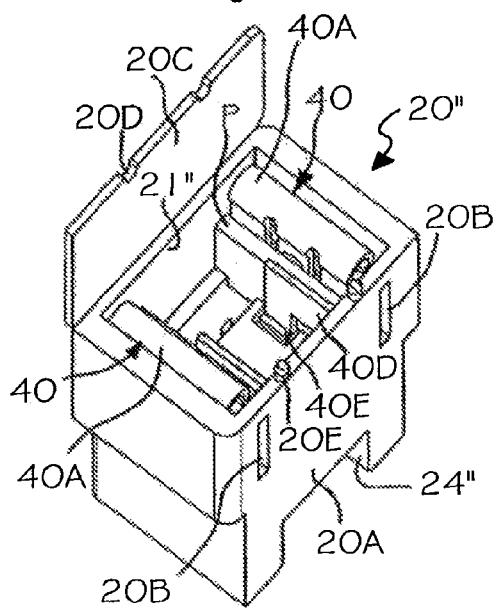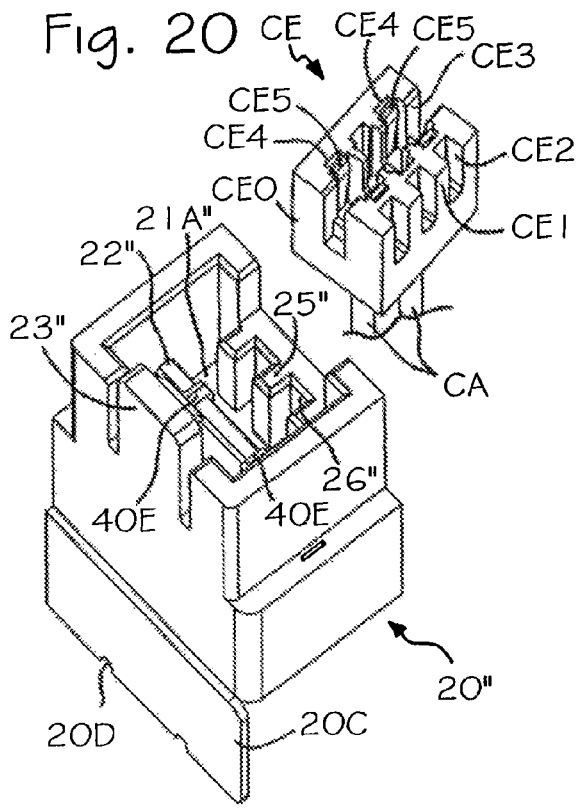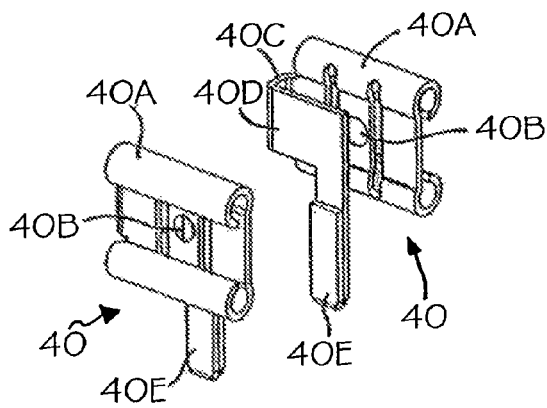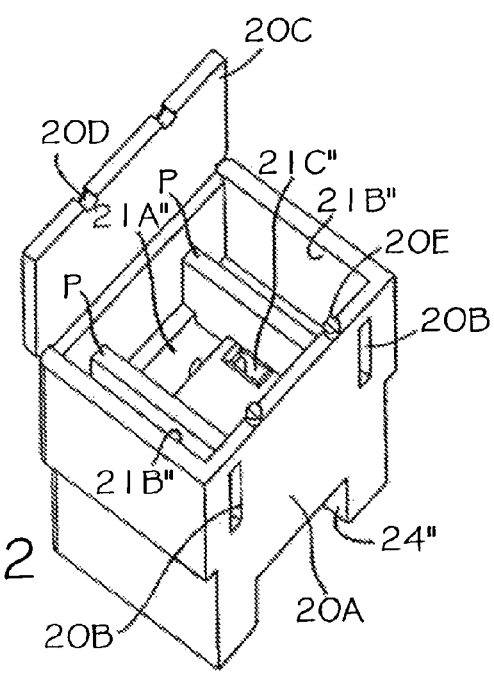

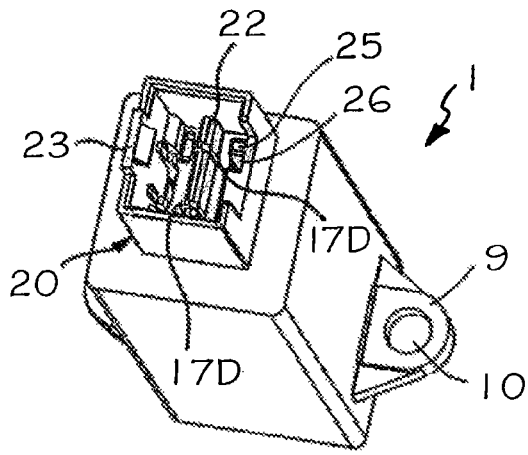
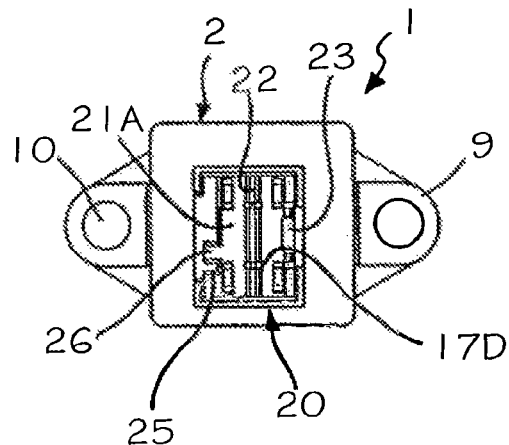
Fig. 27
Fig. 28
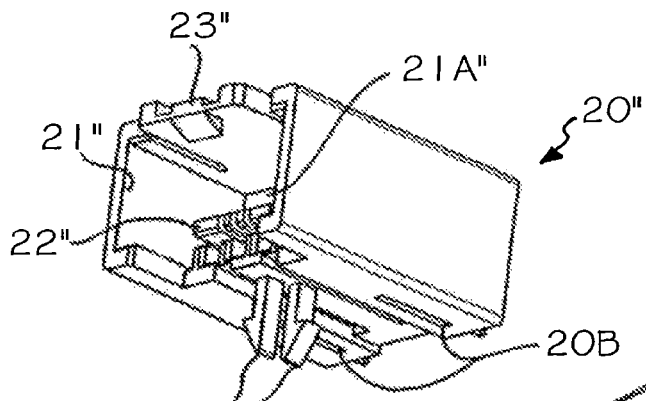
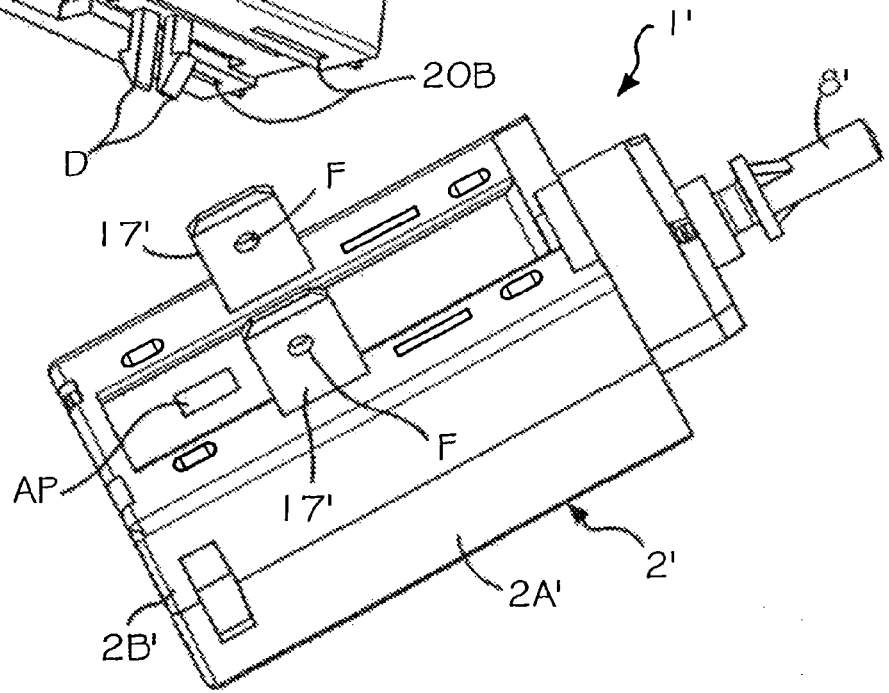
Fig. 29

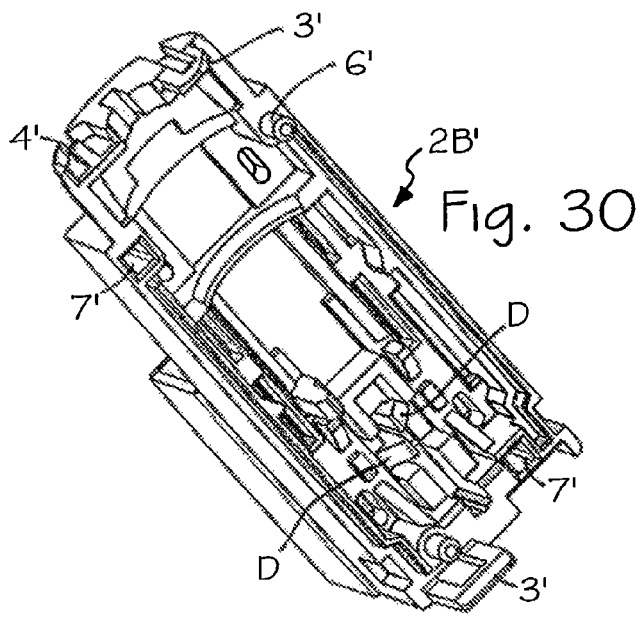
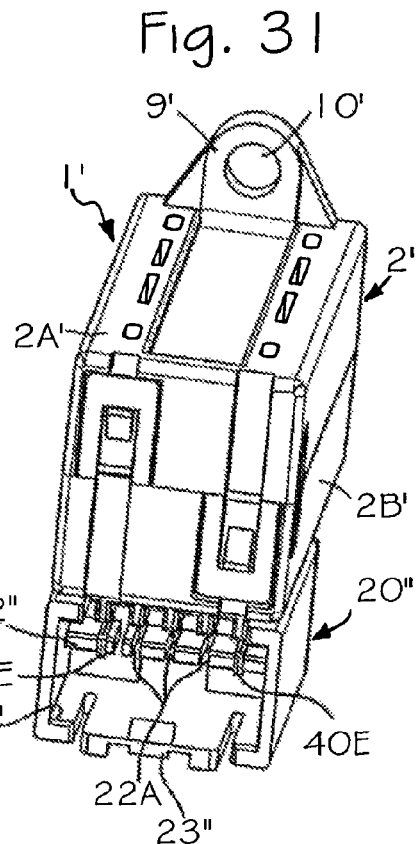
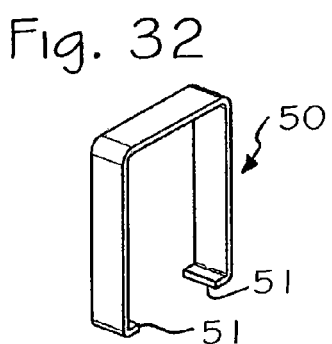
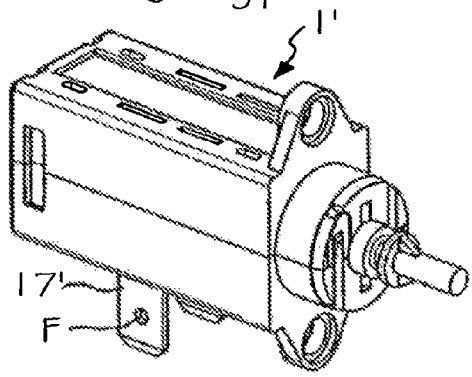
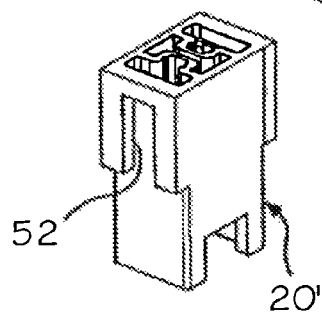
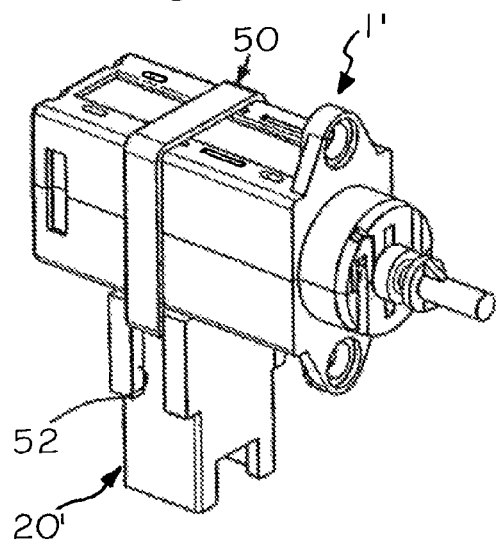

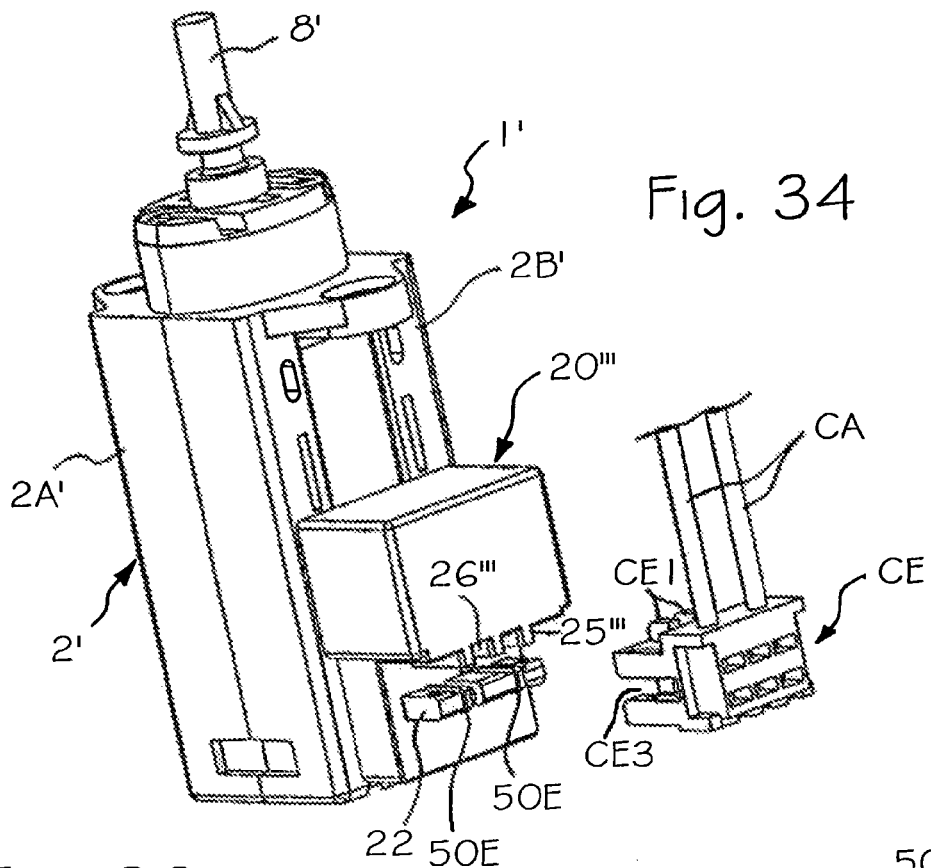
Fig. 34
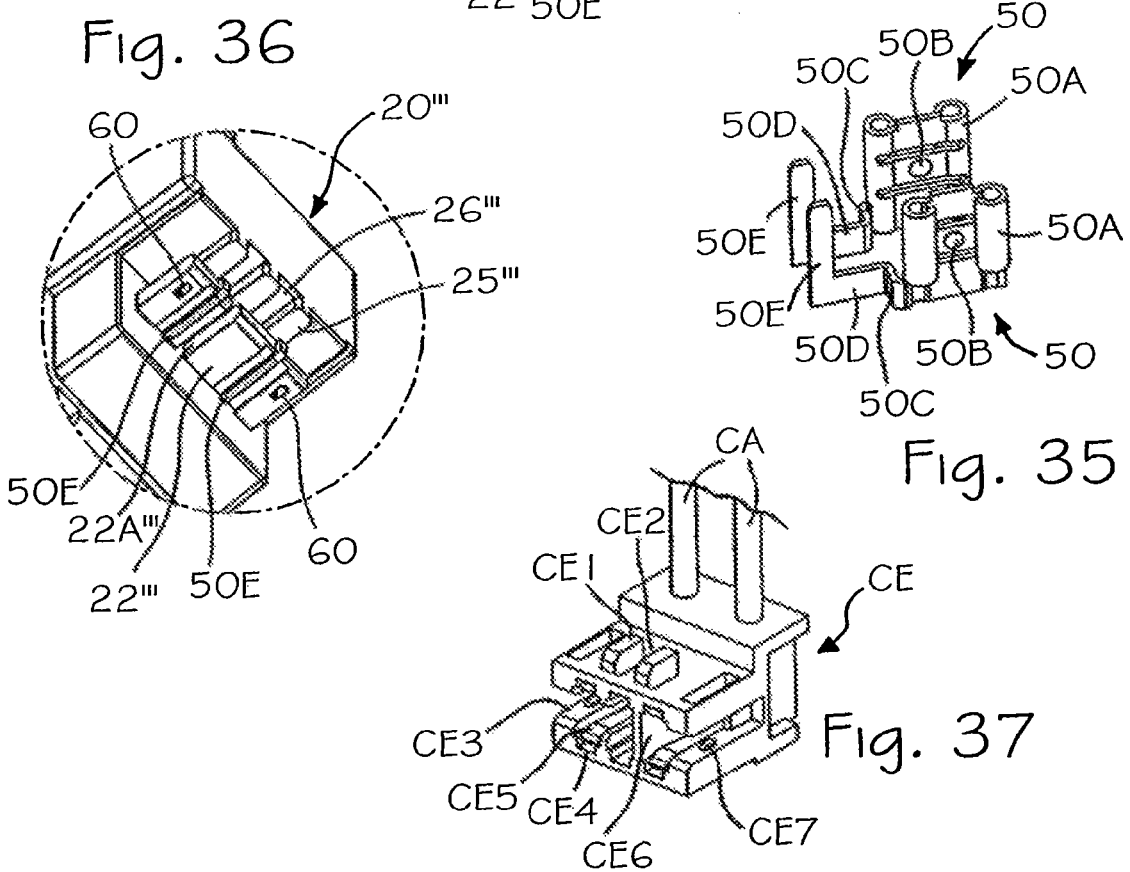
Fig. 36
Fig. 35
Fig. 37

ELECTRO-THERMAL ACTUATOR DEVICE

CROSS REFERENCE TO RELATED APPLICATIONS

This application is a continuation of U.S. patent application Ser. No. 12/837,822, filed on Jul. 16, 2010, and issued on Aug. 21, 2012 as U.S. Pat. No. 8,245,510, which is a continuation of U.S. Ser. No. 11/454,776, filed on Jun. 16, 2006 and issued on Aug. 24, 2012 as U.S. Pat. No. 7,779,631, which is a continuation of PCT International Application No. PCT/IB2004/004063 filed on 8 Dec. 2004 and published in English on 21 Jul. 2005 as WO 2005/066489 A1, and which claims priority to Italian Patent Application No. TO2003A001038, filed on Dec. 24, 2003, the entire disclosures of which are incorporated herein by reference.

FIELD OF THE INVENTION

The present invention relates to an electro-thermal or thermoelectric actuator device.

BACKGROUND OF THE INVENTION

Devices of the above type typically comprise a case made of thermoplastic material, within which are contained a thermal actuator and, at least partially, an actuating shaft. The actuator in turn comprises a body made of electrically and thermally conductive material (e.g. steel), containing a temperature-expandable material, such as a wax, into which is at least partially immersed a piston, destined to drive the actuating shaft; said body is in contact with an electrical heater, usually a PTC resistor.

Actuator devices of the above type are described, for example, in the documents U.S. Pat. No. 5,572,869, U.S. Pat. No. 6,240,728, U.S. Pat. No. 6,121,588, U.S. Pat. No. 5,968,395, U.S. Pat. No. 5,656,986.

In order to electrically power the heater of the device, it is provided with two contact blades or terminals, each having a portion inside the case and a portion projecting from the case. The inner portion of said blades defines respective elastic terminations or wings, to achieve contact with the body of the actuator and the heater; the projecting portions of the blades instead are shaped in the manner of male "faston" terminals or contacts. On each of said projecting portions is fitted a respective female "faston" connector, which constitutes the terminal element of a respective power supply cable; said connection operation is usually performed manually by an operator, who physically couples each female faston connector on each respective male faston terminal of the actuator device.

The Applicant has noted, as a result of practical simulations conducted, that the aforesaid prior art of electrically connecting actuator devices is a source of possible drawbacks.

First drawbacks occur when known actuator devices are used in particularly challenging work conditions, such as those characterised by high vibrations. For example, in case of use of an actuator devices of the type indicated above on laundry washing machines, the vibrations in particular operating conditions (high speed centrifuges with unbalanced load) and the thermal stresses whereto are subjected the contact blades and the thermoplastic case of the device can, in the long run, compromise the quality and soundness of the electrical connection.

Other drawbacks are linked to the configuration of said male faston terminals, which are exposed outside the body of the actuator device, favouring the risk of accidental contact with other parts; in practice, it has been observed that sometimes the female faston is not completely coupled on the male faston of the device, also due to the high insertion force required, and this determines the presence of an area outside the actuator device that is not protected or not electrically isolated, and is a possible cause of accidental contacts and/or electrocution risks.

The use of single faston connectors, typical of the prior art, can also determine the risk of erroneous wiring, where for example to the electro-thermal device are connected the female faston connectors destined to another device, e.g. a thermostatic switch, and vice versa; in this situation, therefore, short circuits may occur, which are able severely to damage the electrical system of the electrical appliance and/or of the control apparatus. In other cases, instead, there is a need to connect multiple thermoelectric actuators of the same type, but coupled with different apparatuses (e.g.: diverting valves, detergent dispensers, etcetera), though still in the same apparatus; considering that, in the prior art, the type of connector is the same for every actuator of the various devices, there is a risk to connect a device instead of another one. Moreover, in the production phase, different types of thermoelectric actuators are often produced; the actuators may be externally unchanged but may be differentiated by their internal components (e.g. the type of heater), and/or by the testing parameters, which may differ from one model to another; to date, this diversity is made apparent only by means of different codes (captions) or colours, which in any case cannot prevent an erroneous mounting and/or connection of a thermoelectric actuator of a first type instead of a thermoelectric actuator of a second type, with the obvious consequence that the operation will not be correct.

In its general terms, the object of the present invention is to solve one or more of the aforesaid drawbacks, and in particular to obtain an electro-thermal actuator comprising electrical interconnection means able to guarantee a connection that is certain, reliable and secure over time.

This and other objects, which shall become readily apparent below, are achieved according to the present invention by an electro-thermal actuator device having the characteristics set out in the appended claims, which are an integral part of the present description.

BRIEF DESCRIPTION OF THE DRAWINGS

Additional objects, characteristics and advantages of the present invention shall become readily apparent from the detailed description that follows and from the accompanying drawings, provided purely by way of non limiting example, in which:

FIGS. 1 and 2 are perspective views from different angles of an actuator device in a first embodiment of the invention;

FIG. 3 is a schematic section of the device of FIG. 1;

FIGS. 4 and 5 are perspective views of two electrical contact terminals of the device of FIG. 1;

FIG. 6 is a perspective view of a component of the case of the device of FIG. 1, provided with the terminals of FIGS. 4 and 5;

FIGS. 7 and 8 are perspective views from different angles of an actuator device in a second embodiment of the invention;

FIG. 9 is a perspective view of an external connector destined to co-operate with the actuator device of FIGS. 7 and 8;

FIGS. 10 and 11 are perspective views from different angles of an adapter unit which equips the device of FIGS. 7 and 8;

FIG. 12 is a perspective view of two connection terminals of the unit of FIG. 10;

FIGS. 13 and 14 are respectively a first perspective view and a first plan view of only the thermoplastic body of the unit of FIG. 10;

FIGS. 15 and 16 are respectively a second perspective view and a second plan view of only the thermoplastic body of the unit of FIG. 10;

FIGS. 17 and 18 are perspective views from different angles of an actuator device in a third embodiment of the invention;

FIGS. 19 and 20 are perspective views from different angles of an adapter unit which equips the device of FIGS. 17 and 18, FIG. 20 further showing an external connector destined to co-operate with said adapter unit;

FIG. 21 is a perspective view of two connection terminals of the unit of FIG. 19;

FIGS. 22 and 23 are respectively a first perspective view and a first plan view of only the thermoplastic body of the unit of FIG. 18;

FIGS. 26, 27 and 28 are respectively a first perspective view, a second perspective view and a bottom plan view of an actuator device in a fourth embodiment of the invention;

FIG. 29 is a perspective view of two components of an actuator device in a fifth embodiment of the invention;

FIG. 30 is a perspective view of a part of the case of the device of FIG. 29, whereto is associated a respective adapter unit;

FIG. 31 is a perspective view of the device of FIG. 29, with the two aforesaid components associated with each other;

FIG. 32 is a perspective view of some components of an actuator device in a fourth embodiment of the invention;

FIG. 33 is a perspective view of the actuator device of FIG. 31, with the two aforesaid components assembled with each other;

FIG. 34 is a perspective view of an actuator device in a fifth embodiment of the invention, with an external connector destined to co-operate with the device;

FIG. 35 is a perspective view of two connection terminals of an adapter unit of the device of FIG. 34;

FIG. 36 is a perspective view of a detail of the adapter unit of the device FIG. 33;

FIG. 37 is a perspective view of an external connector destined to co-operate with the adapter unit of FIG. 34.

DETAILED DESCRIPTION OF THE DRAWINGS

Figure 23:
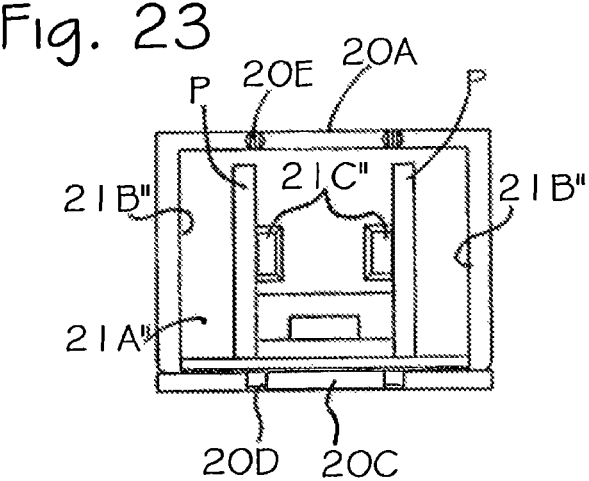

FIGS. 1 and 6 show a first possible embodiment of the invention. With particular reference to FIGS. 1-3, the number 1 globally designates an electro-thermal actuator device according to the invention, which comprises an outer case or body 2 formed by two half-shells 2A and 2B made of insulating material, preferably of the moulded thermoplastic type. Each half-shell 2A, 2B has engagement means provided to co-operate with similar engagement means provided on the other half-shell; in the exemplified case, said mutual engagement means are represented by elastic tabs 3, provided with a respective seat, each destined to be engaged with a respective engagement tooth 4. On the surfaces of the half-shells 2A, 2B destined to match, designated by the reference 5 in FIG. 3, are defined respective positioning elements, in particular projecting stakes 6 and cavities 7, adapted to mutually couple for the purpose of forming the case 2. On at least part of said surfaces 5 could also be provided suitable sealing means, such as an elastic element or gasket (not shown). At a longitudinal end of the case 2 is defined an opening, wherefrom projects a portion of an actuating element or shaft 8. Each half-shell 2A, 2B defines at least part of a fastening element, such as a bracket 9, provided with holes 10, whereby the case 2 can be secured, e.g. with screws or other known fastening means, to a part of the apparatus whereon the device 1 is assembled and/or used.

As shown in FIG. 3, the case 2 internally defines at least one seat or cavity, within which is housed a thermal actuator, globally designated by the reference 11, comprising at least one thruster element or piston 12; one end of the piston 12 is inserted inside the body 11A of the actuator 11, in which is contained a heat-expandable material 14, such as a wax, whilst the other end projects therefrom, the piston 12 cooperating with appropriate sealing means 13. In the example of FIG. 3, the piston 12 is directly in contact with the heat-expandable material or wax 14, whilst the sealing means 13 comprise at least two elements or rigid washers, preferably made of metal, and an element or washer made of elastic material; the piston 12 traverses the sealing elements 13, maintained in position in the body 11A by means of appropriate projections and/or rivetings or depressions of the body. The body 11A of the thermal actuator 11 is maintained in position inside the case 2, within which is at least partially housed also the shaft 8. Said shaft 8 is movable under the action of the piston 12, in contrast with the action of a spring 15, also housed within the case 2, between the upper part thereof and a projection or widening 8A of the shaft 8; as shown in FIG. 3, at the widening 8A the end of the shaft 8 has a seat or concave region, within which is positioned the end of the body 11A wherefrom projects the piston 12; the opposite end of the shaft 8 projects from the aforesaid upper opening of the case 2. In the exemplified case, the two half-shells 2A and 2B are so constructed that at least part of the respective surfaces 5 can couple, preferably, at a through plane that axially traverses the actuator 11 and/or the actuating shaft 3.

The reference number 16 designates in FIG. 3 a heating element for the actuator 11, such as a positive temperature coefficient thermistor or PTC, and the reference number 17 designates two electrical power supply terminals. As shall become readily apparent below, each of the terminals 17 has a portion housed within the case 2, provided with respective elastic blades to achieve electrical contact with the heating element 16 and with the body 11A of the actuator 11, which is made of electrically and thermally conductive material, e.g. a metal, preferably a steel; in this way, an electrical continuity or a series connection between a first terminal 17, the actuator 11, the heating element 16 and the second terminal 17 can be obtained.

According to an aspect of the invention, in the version exemplified in FIGS. 1-6, a part of the case 2 is so shaped as to form, together with a respective part of the outer portion of the terminals 17, a specific multipolar connector, to interconnect the device 1 to a respective source of electrical power supply and/or to a control apparatus of the device. In a preferential version, the aforementioned parts of the outer portions of the terminals 17 and part of the case 2 are shaped in the manner of a standard electrical connector, in particular of the Rast 2,5 type.

In the exemplified case, the half-shell 2B outwards has a projecting portion or a projection 20, which defines a cavity or seat 21 with substantially quadrangular section, from whose closed bottom 21A rises an intermediate wall 22, wherefrom a respective portion of the terminals 17 projects to a minimal extent; at a lateral wall of the portion 20 is defined an engagement element, such as an elastic tab 23 bearing a tooth, provided for the mutual coupling with an external electrical connector, not shown herein, belonging for example to the wiring of the user apparatus (a connector of this type, globally designated by the reference CE, is shown in the subsequent FIG. 9 with a related wiring segment CA).

The wall of the portion 20 opposite the one in which the tab 23 is defined has a recessed or shaped area 24, whereat, for example towards the interior of the seat 21, is formed a so-called "key" or "coding" for the unique insertion of the aforesaid external connector into the seat 21; as is well known, said keys are provided to allow coupling only between two connectors (male-female) of a same type, i.e. with the same key or coding; said solution also allows to avoid accidental polarity inversions, in case of need therefor. In the exemplified case, the aforesaid key is constituted by a series of protrusions or projections, whereof one is visible in 25, interspersed by respective slots or seats, whereof one is visible in 26. Obviously, the aforesaid insertion key may be configured differently, or have multiple seats, e.g. differently spaced from each other, in any case able to couple only with a respective connector of the user apparatus. Note that the polarisation of the connector of the device 1 can also be determined by means of seats or slots obtained in the wall 22, which co-operate with projections internal to the external connector. In this case the engagement tooth 23 can be moved on the external connector, whilst a related engagement seat or hole will be present on the case of the thermoactuator device.

In the intermediate wall 22, as well as in the bottom wall 21A of the seat 21 are present two passages, not visible in the figures, which communicate directly with the interior of the case 2; each of these passages is adapted to receive a portion of a respective a portion of a respective terminal 17, in such a way that the end region thereof is positioned at the wall 22. In the bottom wall 21A of the seat 21 are also present two additional through openings, one of which is designated by the reference number 27 in FIG. 2, whose function shall be clarified farther on.

FIGS. 4 and 5 show a possible embodiment of the terminals 17, which are preferably obtained from sheared and bent metal strap. Each terminal 17 has a pair of tabs or terminations 17A destined to press elastically on the body 11A of the actuator 11 and/or on the heater 16, in particular for purposes of electrical contacting; said tabs 17A extend from the head end of a rectilinear central portion of the respective terminal 17, designated by the reference 17B, from whose opposite end orthogonally extends an intermediate portion 17C, which lies in a different plane from that of the portion 17B; from said intermediate portion 17C in turn orthogonally depart a central contact portion 17D and two lateral appendages 17E, in particular for fastening or locking relative to the body 2; as shown in FIG. 4, the parts 17D and 17E extend substantially parallel relative to portion 17B, but in one or more planes, different from that of said portion 17B.

As shown in FIG. 6, the terminals 17 are provided to be implanted or inserted in the body 2, in particular in respective passages formed in the half-shell 2B and locked therein, in such a way that the portions 17A and 17B remain within the case 2 and tabs 17A can achieve electrical contact with the heater 16 and the body of the actuator 11; the portion 17C is to bear on the inner surface of the half-shell 2B, with each of the locking appendages 17E inserted in a respective passages 27 of FIG. 2; the portion 17D of each terminal is inserted instead in a respective passage which, as indicated above, terminates in correspondence of the intermediate wall 22. Once said insertion is achieved, the ends of the appendages 17E are bent substantially into L shapes as shown in FIGS. 2 and 5, in such a way as to lock the terminal 17 relative to the bottom wall 21A of the seat 21 and hence to the half-shell 2B. Preferably, the end part of the portion 17D projects both frontally and laterally from the intermediate wall 22, as shown in FIG. 2, or in any case it has at least one profile or one surface able to allow to achieve electrical contact with the external connector. Said profile or surface is preferably obtained in the thickness of the terminal 17, i.e. in the thickness of the metal strap that realises it. Alternatively, the aforesaid contact profile of the portion 17D can be obtained from the main surface of the terminal or strap, e.g. rotating by 90.degree. The end 17D of the terminals; in the case of thin metal straps, the end 17D is preferably bent back onto itself, to double its thickness and make it project from both faces of the wall 22, in order to allow contacting on both sides of the wall, although this may not be indispensable.

In the case described above, the terminals 17 are provided to be inserted or implanted in the half-shell 2B, after obtaining it; however, it is clear that, in a possible variation, the body made of thermoplastic material of the half-shell 2B could be moulded directly over terminals previously obtained from a strap, which may have a different shape from the one exemplified. If the case is moulded over the terminals 17, the tabs 17E could be at least partly incorporated in the plastic of the body, for fastening purposes; to this end, the tabs 17E could bent back before the moulding of the thermoplastic material, in order to increase tightness at extraction.

From the above it is therefore readily apparent that the actuation device 1 according to the non limiting example of FIGS. 1-6 is in fact provided with a specific connector, comprising engagement and/or polarisation or coding means, e.g. formed by the portion 20 with the respective seat 21, whereat protrude an intermediate wall 22 and/or the ends 17D of the terminals 17. The type of connector constructed is in particular of the type commonly known as Rast 2,5, provided with insertion or coding key 25-26 as well as means 23 for mechanically securing in position the complementary external connector, destined to be inserted at least partially into the seat 21, said seat thereby forming at least part of a positioning region for said external connector.

FIGS. 7-16 show a possible embodiment variant of the invention, in accordance with which is provided an adapter unit, globally designated as 20'. As shown in FIGS. 7 and 8, the unit 20' is destined to be engaged on a traditional electrothermal actuator device, e.g. of the type known from the US documents described above, to transform said actuator device into a device provided with a specific connector. Said known device, designated by the reference 1' in FIGS. 7 and 8, has two connectors or contact blades 17' having external ends shaped in the manner of a "faston" male terminal directly projecting from the respective case 2'.

The body of the unit 20' preferably has at least one part with a structure that is substantially similar to that of the body of the tubular portion 20 of FIGS. 1-6, but the body of the unit 20' is configured as a distinct component from the case 2' of the device 1'; for this reason, in FIGS. 7-16 the same numbers of the previous figures are used to designate elements equivalent to those shown previously, with the addition of the index '.

As shown in FIGS. 10 and 11, the body of the unit 20' has an inner cavity, subdivided by a wall 21A' in two distinct areas; one (shown in FIG. 10) for housing and/or connecting the projecting ends of the contact blades or connectors 17' of the device 1' and the other one (shown in FIG. 11) constituting a seat 21', which is part of a positioning region for a complementary external connector, globally designated by the reference CE in FIG. 9. In these two regions, and through the wall 21A', are positioned two connecting terminals, designated by the reference 30.

FIG. 12 shows the two terminals 30 inside the adapter unit 20; said terminals 30 are appropriately shaped to "transform"

the portion of the contact blades 17' which projects from the case 2' of the device 1' into a connector with different pitch.

Each terminal 30 has, for this purpose, a female portion 30A, substantially of the "faston" type, destined to receive the portion of the blades or connectors 17' that projects from the case 2'. In accordance with the prior art, the portion 30A has lateral regions folded back onto themselves, to define between them a female seat; within said portion 30A is defined a protrusion or projection 30B, which is provided to co-operate with the hole traditionally provided on the male portion of faston terminals (such a hole, for example, is designated by the reference F in FIG. 7). From the portion 30A orthogonally extends an intermediate portion 30C, in a different plane with respect thereto; from the portion 30C extends, again orthogonally and in a different plane, a final portion 30D, preferably folded back onto itself, which is globally substantially parallel relative to the portion 30A; in an intermediate point or at the end of said portion 30D are present two engaging or locking appendages 30E, in particular diverging from each other.

The portions 30D, when integrated to the unit 20', are distanced from each other by a lesser measure than the distance between the blades or connectors 17' of the device 1' and are preferably located in an area between the corresponding planes or whereon said blades 17' lie.

FIGS. 13-16 show only the body made of isolating thermoplastic material of the unit 20'. As shown in FIGS. 13 and 14, in the part of the cavity of the body destined to receive the external portions of the blades or connectors 17' are defined two distinct seats or chambers 21B, destined to house the female portions 30A of the terminals 30. On the bottom of said chambers 21B, and hence through the wall 21A, are present through openings, designated by reference 21C in FIG. 14, each destined to house a respective portion 30D of the terminals 30. On two opposite walls of each chamber 21B are provided respective longitudinal grooves 21D, interrupted in an intermediate region, designated by the reference 21E in FIG. 13, by means able to determine an engagement region, such as a projection of the body of the unit 20'. FIGS. 15 and 16 instead show the part of the cavity that is destined to receive the external connector CE, i.e. the seat 21'; said Figures clearly show projections 25' and the slots 26' which form a respective key or code for inserting the connector CE into the adapter unit 20', as well as the intermediate wall 22', where the passages 21C indicated above end.

From FIG. 9 it is readily apparent that on an external part of the body CE0 of the connector CE is defined an alternating series of projections CE1 and slots CE2, which are destined to co-operate respectively with the slots 26' and the projections 25' to allow only one possible way to insert the body CE0 into the seat 21'; the body CE0 then defines a longitudinal groove CE3; along each greater edge of the groove CE3 are defined opposite seats CE4, within which are housed respective electrical contacting elements in the form of elastic blades CE5, able to realise one or more contacts of the connector CE, each of said contacts being electrically connected to a respective electrical conductor or cable of the wiring CA.

For the purposes of the realisation of the unit 20', each terminal 30 is inserted into the respective chamber 21B, so that the portion 30D is inserted in the respective passage 21C and the two diverging appendages 30E are entered each in a respective groove 21D. The terminal 30 is then pressed towards the interior of the chamber 21B, until the appendages 30E reach the interrupted, or engagement, region 21E of the respective groove 21D; continuing in the insertion thrust, the appendages 30E flex elastically, in such a way as to overcome the interruption 21E and to return immediately afterwards in the continuation of the respective groove 21D. At this point, the implanting of the terminal 30 is completed, with said terminal locked in the final position, by means of the appendages 30E, in which position part of the portion 30D projects at the wall 22', as shown in FIG. 11. As explained above, the fact that the portion 30D may be formed by bending back onto itself at least part of the strap and/or of the terminal 30, allows to increase the thickness of said portion and thereby advantageously increase the final electrical contact surface.

The adapter unit 20' can then be coupled on the device 1', inserting the external portions of the blades or connectors 17' all the way into the female portions 30A of the terminals 30, until obtaining the coupling between the protrusions 30B and the respective holes F of the blades 17'. As a result of this operation, then, the device 1' is modified, i.e. provided with a specific connector of a second type, in the case exemplified of the Rast 2,5 type, whereto can be interconnected a respective complementary connector CE, connected to suitable electrical wiring and/or to power supply cables and/or to the control system of the device 1'.

The coupling between the connector CE and the unit 20' is achieved by inserting the body CE0 into the cavity 21', with the projections CE1 facing the slots 26' and the slots CE2 facing the projections 25'; only in this way can the body CE0 be thrust inside the seat 21', in order for the wall 22' to be inserted in the longitudinal groove CE3; in this condition, the blades CE5 are at least in part elastically pressed on the regions of the portions 30D of the terminals 30 which project from the wall 22'; the tooth 23' is engaged on the body CE0, in order to complete the mechanical coupling with the unit 20'.

In the case of the embodiment of FIGS. 7-16, with the unit 20' mounted on the actuator 1', the seat 21' and/or the portions 30D of the terminals 30 extend axially in a perpendicular direction relative to the axial development of the case 2', or with respect to the direction of motion of the shaft 8' of the device 1'. In other words, therefore, the movement of insertion of the external connector CE into the seat 21' must take place in a direction that is substantially perpendicular relative to said axis of the case 2' or shaft 3'. In this embodiment, the terminals 30 are integrally engaged with the connectors 17' of the actuator 1' and integrally engaged with the body of the adapter unit 20'; moreover, the connector CE is integrally engaged with the body of the adapter unit 20'; consequently, the connector CE is integrally engaged with the device 1', in such a way as to prevent the risk of alterations of the electrical connection, e.g. as a result of vibrations or traction on the wiring of the connector CE.

In a possible variant of the invention, the seat which is to receive the external connector CE could extend axially in a direction parallel to that of the case 2' or of the shaft 8', so that also the insertion motion of said external connector into the adapter unit takes place in a parallel relative to the develop of the case 2' or of the shaft 8'. Such an embodiment variant is shown in FIGS. 17-25. It should be noted that in these figures, too, the same numbers are used as in the previous figures, to designate elements equivalent to those already shown, with the addition of the index".

The adapter unit according to the proposed variant, designated by the reference 20" in FIGS. 17 and 18, is to be coupled with a traditional electro-thermal actuator device 1' with contact blades or connectors 17' having ends shaped in the manner of "faston" male terminal, directly projecting from the respective case 2'.

As shown in FIGS. 19 and 20, the body of the unit 20" has an inner cavity, subdivided by a wall 21A" in two distinct areas, one visible in FIG. 19 and destined to receive the portions of the blades 17' that project from the device 1' and the other one visible in FIG. 19, designated by the reference number 21", destined to receive the respective external connector CE, whose construction is substantially similar to the one shown in FIG. 9. In these two regions, and through the wall 21A", are positioned two connecting terminals, designated by the reference 40. As shown in FIG. 19, in a wall 20A of the body of the unit 20" are present two slits 20B, mutually parallel and through which the projecting portions of the blades 17' of the device 1' can reach the terminals 40.

FIG. 21 shows the two internal terminals 40 of the unit 20"; said terminals 40 are also appropriately shaped by strap to "transform" the projecting portion of the blades 17' of the device 1' into a connector of a different type and/or pitch. Each terminal 40 has, for this purpose, a female portion 40A, destined to receive the portion of the blades 17', substantially similar to the homologous portion 30A of the terminals 30 described above, and provided with a respective protrusion 40B. From the portion 40A orthogonally extends, in a different plane, an intermediate portion 40C, wherefrom then extends, also orthogonally, a portion 40D which is substantially parallel to the portion 40A. From the second orthogonal portion 40D extends a final or terminal portion 40E, which is perpendicular to the portion 40D but in the same plane thereof, preferably partly folded back onto itself.

Figure 24:
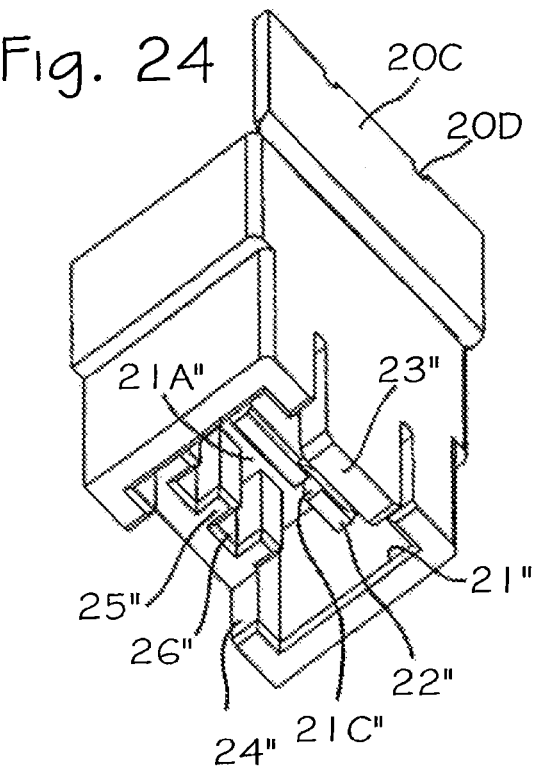
FIGS. 24 and 25 are respectively a second perspective view and a second plan view of only the thermoplastic body of the unit of FIG. 19.
Figure 25:
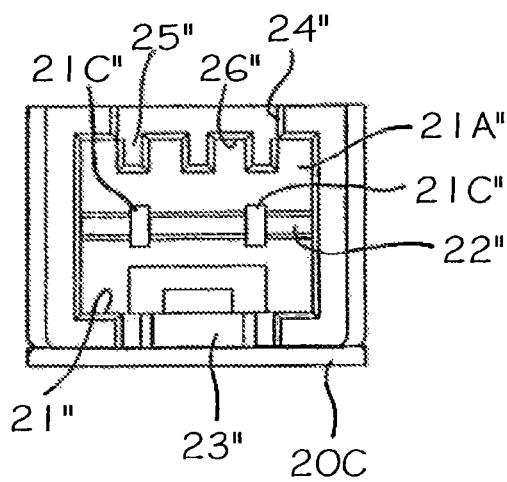

FIGS. 22-25 show only the body made of isolating thermoplastic material of the unit 20". As shown in FIGS. 22 and 23, in the part of the cavity of the body destined to receive the projecting portions of the blades 17' are present two walls P, which extend parallel to each other starting from the wall of the body of the unit 20" opposite the wall 20A, but without reaching said wall 20A; the walls P delimit two chambers 21B", destined to house the female portions 40A of the terminals 40. In the central region of the cavity not occupied by the chambers 21B", through the bottom wall 21A", are present through openings, designated by the reference 21C" in FIG. 22, each destined to receive a respective portion 40E of the terminals 40. FIGS. 24 and 25 instead show the seat 21", destined to receive the external connector CE; from said figures are readily apparent projections 25" and the slots 26" which form a respective insertion key for the unit 20", destined to co-operate with the slots CE2 and the projections CE1 of the connector CE1, as well as the intermediate wall 22", where the passages 21C" indicated above end.

For the purposes of the realisation of the unit 20", each terminal 40 is inserted into the cavity 21", so that the bent back portion 40E is inserted in the respective passage 21C". The terminal 40 is therefore pressed towards the interior of the respective chamber 21", in such a way that the portion 40C of the terminal 40 enters the free space existing between the end of a respective wall P and the wall 20A, with the portion 40A of the terminal 40 which can thus position itself in the respective chamber 21B". At this point the terminal 40 is in its final position, in which the female seat defined by the portion 40A is aligned to a respective slit 20B of the wall 20A, as shown in FIG. 18, and the end of the folded back portion 40E projects from the wall 22", as shown in FIG. 20.

In this case, too, the adapter unit 20" can then be coupled on the device 1', inserting the external portions of the blades 17' into the respective slits 20B of the unit, and hence into the female portions 40A of the terminals 40, until obtaining the coupling between the protrusions 40B and the respective holes F of the blades 17'. As a result of this operation, then, the device 1' is provided with a specific connector, in the case exemplified of the Rast 2,5 type, whereto can be interconnected a respective complementary external connector CE, connected to suitable power supply cables and/or control of the device 1'.

In the embodiment of FIGS. 17-25 the adapter unit 20" is further provided with a small cover, designated by the reference number 20C, which is advantageously obtained from the body of the unit itself; the cover 20C is provided with a respective hinge portion 20C', obtained by exploiting the elasticity of part of the thermoplastic material, preferably with reduced thickness, which constitutes the body of the unit 20", and with engagement seats 20D, destined to co-operate with projections or stakes 20E formed on the upper edge of the wall opposite the one in which the aforesaid hinge is formed (in the exemplified case, the wall 20A of the body of the unit). The presence of this cover 20C allows to assure the protection of the contacts 17'-40, whilst enabling the moulding process with thermoplastic material and the visual inspection of the electrical connection.

In the case of the embodiment of FIGS. 17-25, with the unit 20" mounted on the device 1', the seat 21" and/or the portions 40E of the terminals 40 extend axially in a parallel direction relative to the axial development of the case 2', or with respect to the direction of motion of the shaft 8' of the device 1'. In other words, therefore, the movement of insertion of the external connector CE into the seat 21" must take place in a direction that is substantially parallel relative to said axis of the case 2' or the shaft 8'. In this embodiment, too, the terminals 40, the connectors 17' of the device 1', the body of the adapter unit 20" and the connector CE are integrally engaged with the actuator 1'. In this configuration, in the case of traction on the wiring of the connector CE; resistance against extraction is increased even further, since the force would be exerted in a perpendicular direction relative to the direction of insertion of the connector 17' in the female faston portion 40A.

Figure 26:
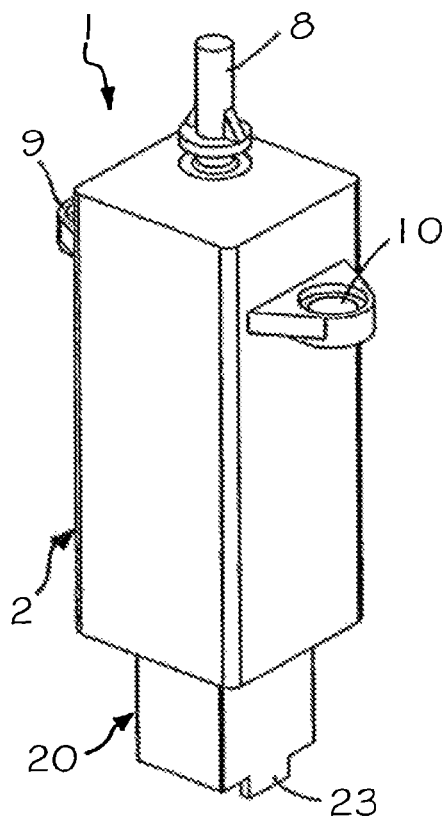

In the embodiment of FIGS. 1-6, the portion 20 of the case 2 which, together with respective portions of the blades 17, constitutes a specific connector, projects laterally from the case, relative to its axial development. FIGS. 26-28, which use the same reference numbers as FIGS. 1-6, show an embodiment variant in which the portion 20 instead projects from the bottom wall of the case 2, i.e. from the longitudinal wall opposite the one wherefrom projects the shaft 8. Apart from the different conformation of the case 2 and the different orientation/shape of the blades 17 within the case, said embodiment is conceptually and constructively similar to the one of FIGS. 1-6. In this embodiment, the portion 20 is preferably formed by the union of at least two parts, each obtained in a single piece with a respective half-shell 2A, 2B of the case 2. In this variant, the portion 20 can be divided in two mutually specular parts, or in two parts divided by a plane perpendicular to the intermediate wall 22; alternatively, the portion 20 can be constituted by two parts divided by a plane parallel to the intermediate wall 22.

A variant of the device according to the invention could comprise two half-shells 2A, 2B obtained dividing the body 2 of the device 1 with a plane perpendicular to the axis of sliding of the shaft 8. In the case of FIGS. 26-28, the portion 20 could be in a single piece while, in the case of FIGS. 1-6, the portion 20 could be divided in at least two parts.

From the above description, the characteristics of the present invention, as well as its advantages, are readily apparent. The fact that, according to the invention, the electrothermal actuator device is provided with a respective and sole connector, in particular of the type with rapid coupling and unique direction, allows considerably to enhance the reliability and safety of the connection necessary for the power supply and/or electrical wiring of the device. The proposed solutions advantageously allow to prevent a double connection operation, typical of the prior art, in accordance with which an operator must manually insert two female faston terminals on the ends of contact blades or connectors of the device, shaped in the manner of a male faston terminal. The invention therefore allows to complete the connection phase in a quicker, easier and more secure way.

The invention further allows to obtain a thermoelectric actuator provided with electrical connection means able to prevent erroneous electrical connections; the invention also provides means able to modify and/or adapt the current types of thermoelectric actuators, transforming them into other types of actuators, in particular of the type with improved reliability and safety.

The present invention advantageously allows to eliminate risks of erroneous wiring. The provision of an insertion key prevents possibly connection errors, or polarity inversions, which are instead typical of the prior art; the provision of engagement means (such as the tab with tooth 23, 23', 23") allows mechanically to secure the connector that equips the devices to the respective complementary external connector, further offering greater assurances on the mutual coupling and/or against the risk of accidental extraction; the possible provision of a projecting part (20) or of a seat (21, 21', 21") able to encompass or receive at least part of the external connector (CE), allows to have a greater protection of the electrical connection, in particular against accidental contacts or short circuits, and/or to have a guide and/or polarisation means for the connection.

Naturally, without altering the principles of the invention, the construction components and materials and the embodiments may be widely varied from what is described and illustrated herein. Moreover, the individual details described above can be produced or obtained with any other known technique and may be partly omitted, or present in different number and disposition, to pursue the objects of the present invention.

In the previously illustrated embodiments, the mutual fastening between the units 20', 20" and the device 1' can be obtained by coupling various terminals or connectors, e.g. between the protrusions 30B, 40B of the terminals 30, 40 with the holes F defined in the blades 17'; in additional variants of the invention, the body of the adapter unit 20', 20" can be physically joined to the case 2', e.g. by means of gluing or sealing, in particular of the heat-melting or vibration type, or by means of over-moulding or co-moulding of thermoplastic material. Another possibility is to provide the body of the unit 20', 20" with engagements destined to co-operate with the case 2'; said engagements can be independent or obtained from a die on the same body as the unit 20', 20", or realised from a suitable strap made of plastic or metallic material, integrated or associated with said body.

A possible embodiment in this sense is shown in FIG. 29, where the body of an adapter unit of the type previously designated by the reference number 20" is provided with two partly elastic appendages, each defining at a respective end an inclined plane engagement tooth D. Said appendages project in substantially perpendicular direction relative to the longitudinal development of the body of the unit 20", with the respective teeth D oriented in opposite directions. The appendages defining the teeth D are destined to be inserted in at least one slit or seat normally present in the case of an electro-thermal actuator device, or obtained specifically, such a slit is designated by the reference AP in FIG. 29.

In this embodiment, after obtaining the unit 20", the teeth D are inserted in the slit AP, in such a way that the presence of the respective inclined plane determines the elastic flexion of the appendages which, for example, approach each other, until aligning with said seat AP. When the inclined planes overcome the edges of the slit AP, with the consequent complete insertion of the teeth D into the cavity internal to the case 2' of the device 1', the appendages are free to return by elastic reaction in the respective initial condition, as shown in FIG. 30, which shows only the half-shell 2B' of the device 1' of FIG. 29; in this way, the unit 20" is mechanically engaged to the case 2' of the device 1'.

FIG. 31, which illustrates the two components 1' and 20" coupled to each other, also shows an alternative embodiment of the connector of the device according to the invention, and in particular of its wall 22", which also embodies a variant of the polarisation or coding key, in this case, in the wall 22" of the unit 20" are formed one or more slits or slots 22A, into which are to be inserted respective appendages or walls of the external connector, not shown herein, to allow their unique insertion into the seat 21"; the slots 22A can be provided in addition to or instead of the projections and the slots previously designated by the references 25, 26, or 25', 26', or 25", 26".

The presence of the slots 22A has as an additional important function that of increasing the electrical isolation between the portions 40E of the terminals 40; in this configuration, the portion 40E also have "in air" isolation, i.e. a greater length of the surface path on the wall 22". Considering the risk of ionic migration, of the metal of the portions 40E, one thereby obtains a reduction in the risk of short circuits, increasing said superficial distance on the wall 22", i.e. the path that said ionic migration should travel. The slots 22A are appropriately contoured for this purposes, and they can be provided independently of the aforesaid coding needs.

FIGS. 32 and 33 show an additional possible embodiment variant of the invention, in accordance with which an adapter unit substantially of the type previously designated by the reference number 20' is fastened mechanically to the respective device 1' with external engagement means, which in particular encompass or envelop at least in part the case of the device. In these figures, the reference 50 designates an engagement element, e.g. made of metallic material, substantially "U"' shaped, provided at the respective ends with engagement terminations 51, able to co-operate with related seats 52 present on the opposite faces of the body of the unit or connector/adapter module 20'. In this case, after coupling the unit 20' on the terminals 17' of the device 1', the element 51 is fitted on the case 2', making its parallel ends diverge from each other, in such a way as to be able to insert the terminations 51 into the seats 52; once this position is reached, the ends of the element 50 can be released, in such a way that the unit 20' is mechanically secured to the case 2', by means of the same engagement element 50, as shown in FIG. 33.

In other possible variants, one or more engagement elements could also be integral with the body of the unit 20' and achieve fastening on the exterior of the body of the device 1.

FIGS. 34-37 show a possible additional embodiment variant of the invention, in accordance with which an adapter unit, designated as 20''', is provided with terminals suitable for "shifting" or translating the region of connection, or of coupling of the respective external connector CE, to a different region from the cases exemplified above, for example towards an end of the case 2' of the device 1', instead of in proximity to the projection region of its terminals 17'. Such a solution allows for example to facilitate the operations of assembling/wiring the actuator device 1 on the respective user apparatus.

For this purpose, the regions of the terminals of the unit 20''' destined to come in contact with the external connector CE could be perpendicular, parallel or at other angles, but in any case translated relative to the respective area of interconnection with the device 1'.

FIG. 35 shows the terminals of the unit 20''', designated by the reference number 50, appropriately contoured, preferably from a strap, to "transform" the projecting portion of the blades 17' of the device 1' into a connector of a different type and/or pitch, and to shift the coupling region of the respective external connector CE relative to the blades. Each terminal 50 has, for this purpose, a female portion 50A, destined to receive the portion of the blades of the device 1', substantially similar to the homologous portion 30A, 40A of the terminals 30, 40 described above, and provided with a respective protrusion 50B. From the portion 50A orthogonally extends, in a same plane, an intermediate portion 50C, wherefrom then extends, also orthogonally and in a different plane, a portion 50D which is substantially parallel to the portion 40A, but in a different plane with respect thereto. From the second orthogonal portion 50D lastly extends a final or terminal portion 50E, which is perpendicular to the portion 50D but in the same plane thereof. As is readily apparent, the arrangement is such that the final portions 50E develop axially in parallel direction relative to the axial development of the initial female portions 50A.

The body of the unit 20''' is not shown in detail; it is sufficient to specify here that it is preferably made of thermoplastic material, in such a way that, in its face oriented towards the case 2' of the device 1' two chambers or housing seats of the portions 50A of the terminals 50 (e.g. similar to the chambers 21B of FIG. 10) and in whose body are defined suitable passages for the remaining portions of the terminals. In this version, the unit 20''' has, on the opposite face, an area in which is defined a wall 22''', having the same functions as the walls 22, 22', 22" of the previous embodiments, wherefrom project the edges of the terminal portions 50E of the terminals 50; as is readily apparent, in this case the wall 22''', which itself constitutes a connector body, is not situated inside a cavity formed by the body of the unit 20''', but is directly exposed towards the exterior of the unit 20''', constituting at least part of a positioning region for the external connector CE.

As shown in detail in FIG. 36, in the wall 22''' is formed at least one slit or slot 22''', within which is destined to be inserted a respective appendage or wall of the external connector CE, designated CE6 in FIG. 37; such an arrangement of parts 22A''', CE1 can be provided to assure the unique coupling between the connector CE and the unit 20''' and/or to enhance the electrical isolation between the portions 50E of the terminals 50. In the example shown, moreover, the external connector CE incorporates engagement means, e.g. in the form of teeth or projections CE7, destined to operate in engagement in respective holes or seats 60 present in the projecting wall 22''' of the adapter/connector module 20'''.

In the case of the embodiment of the described variants, e.g. in FIGS. 7-16, 17-25, 34-36 the terminals 30, 40 could be fastened with other systems suitable for the purpose or welded, in manners known in themselves, to the respective blades 17' of the device, e.g. by means of electrical welding or stack or spot welding.

The device according to the invention was described for the sake of practicality in reference to the use of only two terminals 17, 30, 40, 50; however, in the case of devices 1, 1' of a different type from the one described by way of non limiting example, the use of multiple terminals, for example of three terminals, could become necessary, consider, for example, the case of a thermo-electric actuator device 1 comprising two or more thermal actuators, with respective two or more electrical heaters 16, inserted in a single body or case 2.

In the device of the invention, the structure and/or the individual components of the thermal actuator 11 and/or the entire device 1, 1', may thus have different shape and structure from the aforementioned examples and/or comprise a plurality of thermal actuators 11 and/or a plurality of the details previously described also individually.

The body of the units 20', 20", 20''' could be over-moulded on the respective terminals 30, 40, 50 and/or over-moulded directly on the case 2' of the device 1'.

The electrical terminals 17, 30, 40, 50 are preferably parallel and/or specular to each other; advantageously, for some types of product (e.g. of the type shown in FIGS. 4-5 and 12) the terminals are identical to each other and mounted in mirror fashion; for this purpose, a reduction in the number of the parts of the device and hence of the associated costs is obtained.

Some elements could be replaced with other equivalent elements; for example, at least part of the electrical terminals 17, 30, 40, 50 could replaced or comprise electrical wires internal to the case 2 of the device 1 or internal to the unit 20'; 20", 20'''.

The device of the invention may obviously be obtained by combining at least part of the teachings described with reference to the various figures or variants, previously provided by way of non-limiting example.

In the embodiments described above, the connector 20, 20', 20", 20''' that equips the actuator device according to the invention is substantially of the female type, whilst the respective external complementary connector CE is substantially of the male type; however, it is readily apparent to those skilled in the art that the type or arrangement could be reversed or different from the one exemplified herein.

The invention claimed is:

1. An electro-thermal actuator device comprising a case defining a cavity in which there are housed at least
   one thermal actuator, having a respective body containing a thermo-expandable material, a piston partially inserted in said body and sealing means for said thermo-expandable material, said body being made of an electrically and thermally conductive material,
   one electrical heater in contact with the body of said thermal actuator, the electrical heater being operative to cause heating of said thermo-expandable material, in order to induce a variation in volume thereof and consequently move said piston,
   at least part of an actuating element capable of being actuated as a result of movement of said piston,
   wherein said device comprises a multipolar electrical connection arrangement having a connector body in a fixed position at an outer wall of said case and comprising passages in which respective portions of at least two terminals are housed, said connector body and said terminals being provided for coupling with an external multipolar connector for supplying power to the device,
   wherein said connector body defines a seat for at least partially housing said external connector, an intermediate wall being defined at said seat,
   wherein each of said terminals comprises a contact portion extending within said cavity of said case, for electrically supplying said electrical heater, and an interconnection portion extending outside said cavity of said case,
   wherein the interconnection portion of each of said terminals has at least one part which extends through said intermediate wall, said at least one part having a peripheral region at least partly facing or projecting towards the exterior of said intermediate wall, for allowing electrical coupling with said external connector, and wherein said connector body comprises at least one of:
coding means, operative to allow a unique coupling of the connector body with said external connector, said coding means comprising shaped parts of at least one of said connector body, said case and said intermediate wall; and mechanical coupling mean configured to co-operate with said external connector to maintain the latter in a substantially fixed position relative to said terminals and said intermediate wall.

2. The device as claimed in claim 1, wherein said intermediate wall has at least one intermediate interruption or slot to define at least two separate or main wall sections including a first wall section and a second wall section, said one part of the interconnection portion of one terminal extending through said first wall section and said one part of the interconnection portion of another terminal extending through said second wall section.

3. The device as claimed in claim 1, wherein said intermediate wall has at least one intermediate interruption or slot to define at least two separate or main wall sections including a first wall section and a second wall section, said at least one intermediate interruption or slot forming at least one of a coding means, for allowing a unique coupling of the connector body with said external connector, and an air-gap for enhancing electrical isolation between said one part of the interconnection portion of one terminal extending through said first wall section and said one part of the interconnection portion of another terminal extending through said second wall section.

4. The device as claimed in claim 1, wherein said connector body comprises at least a first wall which envelops or encompasses at least in part said intermediate wall.

5. The device as claimed in claim 1, wherein said case comprises two half-shell.

6. The device as claimed in claim 1,
wherein the contact portion of each terminal comprises a pair of elastically deformable tabs and a first rectilinear portion intermediate to said tabs,
wherein the interconnection portion of each terminal comprises a second rectilinear portion,
wherein the first and the second rectilinear portions of each terminal are parallel to each other,
and wherein the first rectilinear portions of the two terminals are at a first mutual distance and the second rectilinear portions of the two terminals are at a second mutual distance, the first distance being different from the second distance.

7. The device as claimed in claim 6,
wherein said terminals each comprise a first end portion and a second end portion, in the first end portion being defined said contact portion and in the second end portion being defined said interconnection portion,
wherein the first end portions of the terminals are at a first mutual distance and the second end portions of the two terminals are at a second mutual distance, the first distance being greater than the second distance.

8. The device as claimed in claim 7,
wherein each of said first end portions of the two terminals comprises said pair of elastically deformable tabs and said first rectilinear portion intermediate to said tabs,
wherein each of said second end portions of the terminals comprises said second rectilinear portion,
and wherein the second rectilinear portions of the terminals are closer to each other than the first rectilinear portions.

9. The device as claimed in claim 1, wherein said intermediate wall extends longitudinally in a direction that is perpendicular to an axial development of one at least one of said case, said piston and said actuating element.

10. The device as claimed in claim 1, wherein the interconnection portion of each of said terminals at least partly faces or projects towards the exterior of said intermediate wall at at least one of a summit of said intermediate wall and two opposite faces of said intermediate wall.

11. The device as claimed in claim 1, wherein said interconnection portion extends axially according to a substantially perpendicular direction relative to a length direction of said intermediate wall.

12. An electro-thermal actuator device comprising a case defining a cavity in which there are housed at least
one thermal actuator, having a respective body containing a thermo-expandable material, a piston partially inserted in said body and sealing means for said thermo-expandable material, said body being made of an electrically and thermally conductive material,
one electrical heater in contact with the body of said thermal actuator, the electrical heater being a thermistor operative to cause heating of said thermo-expandable material, in order to induce a variation in volume thereof and consequently move said piston,
at least part of an actuating element capable of being actuated as a result of movement of said piston,
wherein said device comprises a multipolar electrical connection arrangement having a connector body in a fixed position at an outer face of said case and comprising passages in which respective portions of at least two terminals are housed, said connector body and said terminals being provided for coupling with an external multipolar connector for supplying power to the device,
wherein said connector body identifies a positioning region for said external connector, an intermediate wall being defined at said positioning region,
wherein each of said terminals comprises a contact portion extending within said cavity of said case, for electrically supplying said electrical heater, and an interconnection portion extending outside said cavity of said case,
wherein the interconnection portion of each of said terminals has a least one part which extends through said intermediate wall and has a peripheral region at least partly facing or projecting towards the exterior of said intermediate wall, for allowing electrical coupling with said external connector,
wherein said multipolar electrical connection arrangement comprises at least one of:
coding means, operative to allow a unique coupling of the connector body with said external connector, said coding means comprising shaped parts of at least one of said connector body, said case and said intermediate wall; and
mechanical coupling means, destined to co-operate with said external connector to maintain the latter in a substantially fixed position relative to said terminals and said intermediate wall;
and wherein said intermediate wall has at least one intermediate interruption or slot to define at least two separate or main wall sections including a first wall section and a second wall section, said one part of the interconnection portion of one terminal extending through said first wall section and said one part of the interconnection portion of another terminal extending through said second wall section.

13. The device as claimed in claim 12, wherein said at least one intermediate interruption or slot forms at least one of a coding means, for allowing a unique coupling of the connector body with said external connector, and an air-gap for enhancing electrical isolation between said one part of the interconnection portion of one terminal extending through said first wall section and said one part of the interconnection portion of another terminal extending through said second wall section.

14. An electro-thermal actuator device comprising a case defining a cavity in which there are housed at least
one thermal actuator, having a respective body containing a thermo-expandable material, a piston partially inserted in said body and sealing means for said thermo-expandable material, said body being made of an electrically and thermally conductive material,
one electrical heater in contact with the body of said thermal actuator, the electrical heater being a thermistor operative to cause heating of said thermo-expandable material, in order to induce a variation in volume thereof and consequently move said piston,
at least part of an actuating element capable of being actuated as a result of movement of said piston,
wherein said device comprises a multipolar electrical connection arrangement comprising at least a connector body connected to said case and having passages in which respective portions of at least two terminals are housed, said connector body and said terminals being provided for coupling with an external multipolar connector supplying power to the device,
wherein said connector body projects from a first wall of said case outside said cavity,
wherein each of said terminals comprises a contact portion extending within said cavity of said case, for electrically supplying said electrical heater, and an interconnection portion extending outside said cavity of said case,
wherein the interconnection portion of each of said terminals at least partly extends within a respective slot of a wall belonging to said connector body with only a peripheral region thereof that at least partly faces or projects towards the exterior of said wall belonging to said connector body, said peripheral region including one side surfaces of the interconnection portion for electrical coupling with said external connector.

15. The device as claimed in claim 14, wherein said multipolar electrical connection arrangement comprises at least one of:
coding means, operative to allow a unique coupling of the connector body with said external connector, said coding means comprising shaped parts of at least one of said connector body, said case and said connector wall; and
mechanical coupling means, destined to co-operate with said external connector to maintain the latter in a substantially fixed position relative to said terminals and said connector wall.

16. The device as claimed in claim 14, wherein said wall belonging to said connector body has at least one intermediate interruption or slot to define at least two separate or main wall sections including a first wall section and a second wall section, the interconnection portion of one terminal extending at least partly through said first wall section and the interconnection portion of another terminal extending at least partly through said second wall section.

17. The device as claimed in claim 14, wherein said wall belonging to said connector body has at least one intermediate interruption or slot to define at least two separate wall sections including a first wall section and a second wall section, said at least one intermediate interruption or slot forming at least one of a coding means, for allowing a unique coupling of the connector body with said external connector, and an air-gap for enhancing electrical isolation between a part of the interconnection portion of one terminal which extends through said first wall section and a part of the interconnection portion of another terminal which extends through said second wall section.

18. An electro-thermal actuator device comprising a case defining a cavity in which there are housed at least
one thermal actuator, having a respective body containing a thermo-expandable material, a piston partially inserted in said body and sealing means for said thermo-expandable material, said body being made of an electrically and thermally conductive material,
one electrical heater in contact with the body of said thermal actuator, the electrical heater being a thermistor operative to cause heating of said thermo-expandable material, in order to induce a variation in volume thereof and consequently move said piston,
at least part of an actuating element capable of being actuated as a result of movement of said piston,
wherein said device comprises a multipolar electrical connection arrangement adapted for quick coupling with a respective external multipolar connector associated with a power supply wiring, said arrangement comprising a connector body connected to said case and comprising passages in which respective portions of at least two terminals are housed, said connector body and said terminals being provided for coupling with an external multipolar connector for supplying power to the device,
wherein said connector body identifies a positioning region for said external connector and includes an intermediate wall at said positioning region,
wherein each of said terminals comprises a contact portion extending within said cavity of said case, for electrically supplying said electrical heater, and an interconnection portion extending outside said cavity of said case,
wherein the interconnection portion of each of said terminals has at least one part which extends through said intermediate wall and has a peripheral region at least partly facing or projecting towards the exterior of said intermediate wall, for allowing electrical coupling with said external connector,
wherein said multipolar electrical connection arrangement comprises:
coding means, operative to allow a unique coupling of the connector body with said external connector, said coding means comprising shaped parts of at least one of said connector body, said case and said intermediate wall; and
mechanical coupling means, destined to co-operate with said external connector to maintain the latter in a substantially fixed position relative to said terminals and said intermediate wall;
and wherein said external connector comprises:
a body defining respective coding means, designed to co-operate with the coding means of said multipolar electrical connection arrangement to allow only one possible way to position said body of the external connector at said positioning region;
a groove in said body of the external connector, adapted to receive said intermediate wall, the groove having, at opposite sides thereof seats within which electrical contacting elements are housed, said contacting elements being electrically connected to respective electrical conductors of said wiring, such that, when said body of the external connector is positioned at said positioning region, said intermediate wall is received in said groove with said one part of the interconnection portion of each of the terminals which is in contact with one said contacting element and with said mechanical coupling means of the multipolar electrical connection arrangement being engaged with said body of the external connector.

19. The device as claimed in claim 18, wherein said intermediate wall has at least one interruption or slot to define at least two separate or main wall sections including a first wall section and a second wall section, said one part of the interconnection portion of one terminal extending through said first wall section and said one part of the interconnection portion of another terminal extending through said second wall section.

20. The device as claimed in claim 19, wherein said at least one intermediate interruption or slot forms at least one of:

a coding means, for allowing a unique coupling of the connector body with said external connector, at least one portion of said body of the external connector which is at said groove being adapted to be received in said at least one intermediate interruption, and an air-gap for enhancing electrical isolation between said one part of the interconnection portion of one terminal extending through said first wall section and said one part of the interconnection portion of another terminal extending through said second wall section.

* * * * *